Jan. 4, 1966 R. A. PANNIER ETAL 3,227,258
ROTARY IMPRINTING MACHINE MOVING SELECTED CHARACTER
TO IMPRINTING POSITION BY SHORTEST ARC
Filed July 31, 1962 9 Sheets-Sheet 1

INVENTORS
RALPH A. PANNIER,
WALTER E. RUDISCH &
EMILE DAVID LONG
BY
*William D. Carothers*

THEIR ATTORNEY

INVENTORS
RALPH A. PANNIER,
WALTER E. RUDISCH &
EMILE DAVID LONG
BY
*William D. Carothers*
THEIR ATTORNEY Jan. 4, 1966    R. A. PANNIER ETAL    3,227,258
ROTARY IMPRINTING MACHINE MOVING SELECTED CHARACTER
TO IMPRINTING POSITION BY SHORTEST ARC
Filed July 31, 1962    9 Sheets-Sheet 3

INVENTORS
RALPH A. PANNIER,
WALTER E. RUDISCH &
BY   EMILE DAVID LONG

THEIR ATTORNEY

REFERENCE
+12 VOLTS

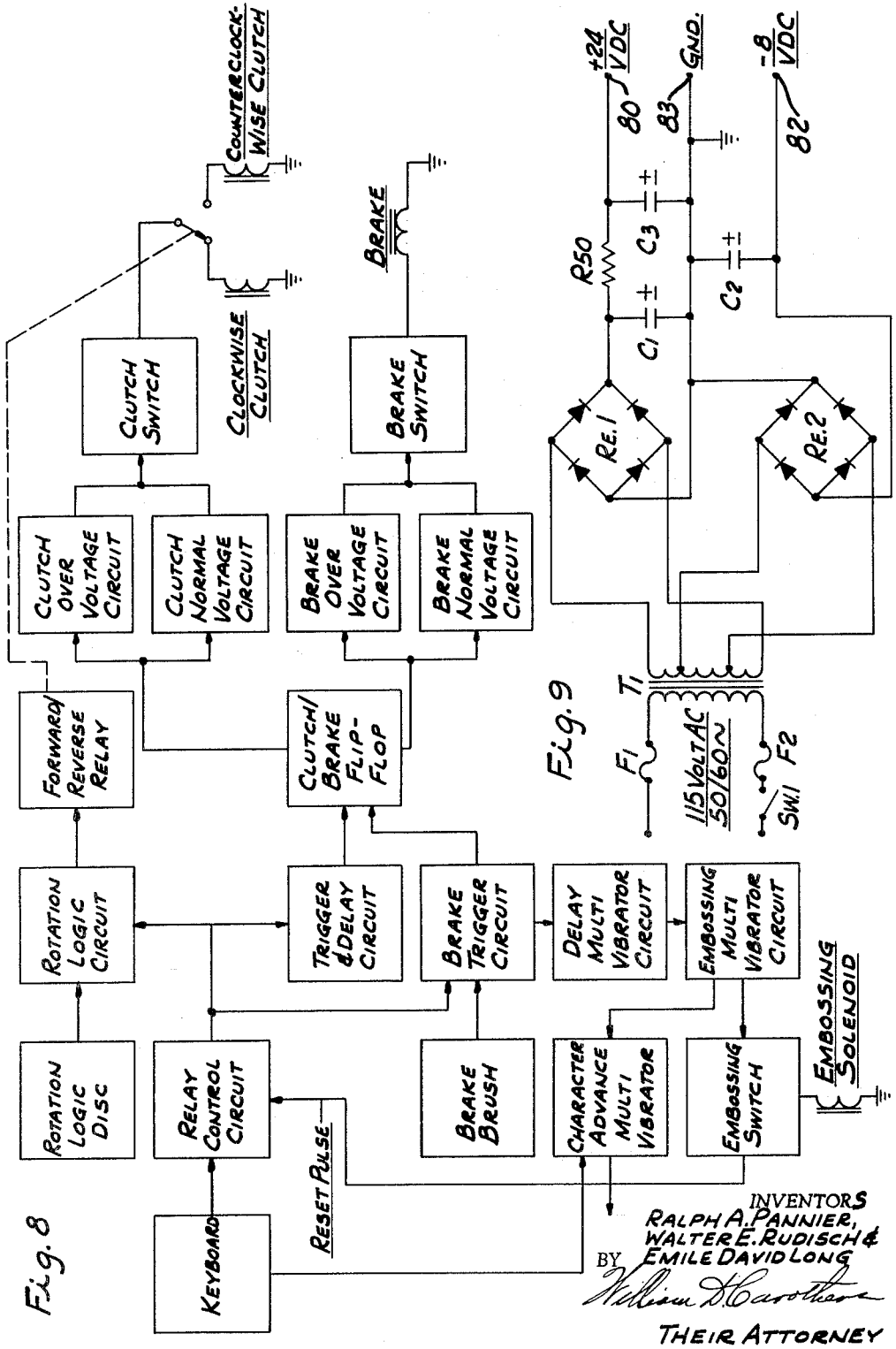

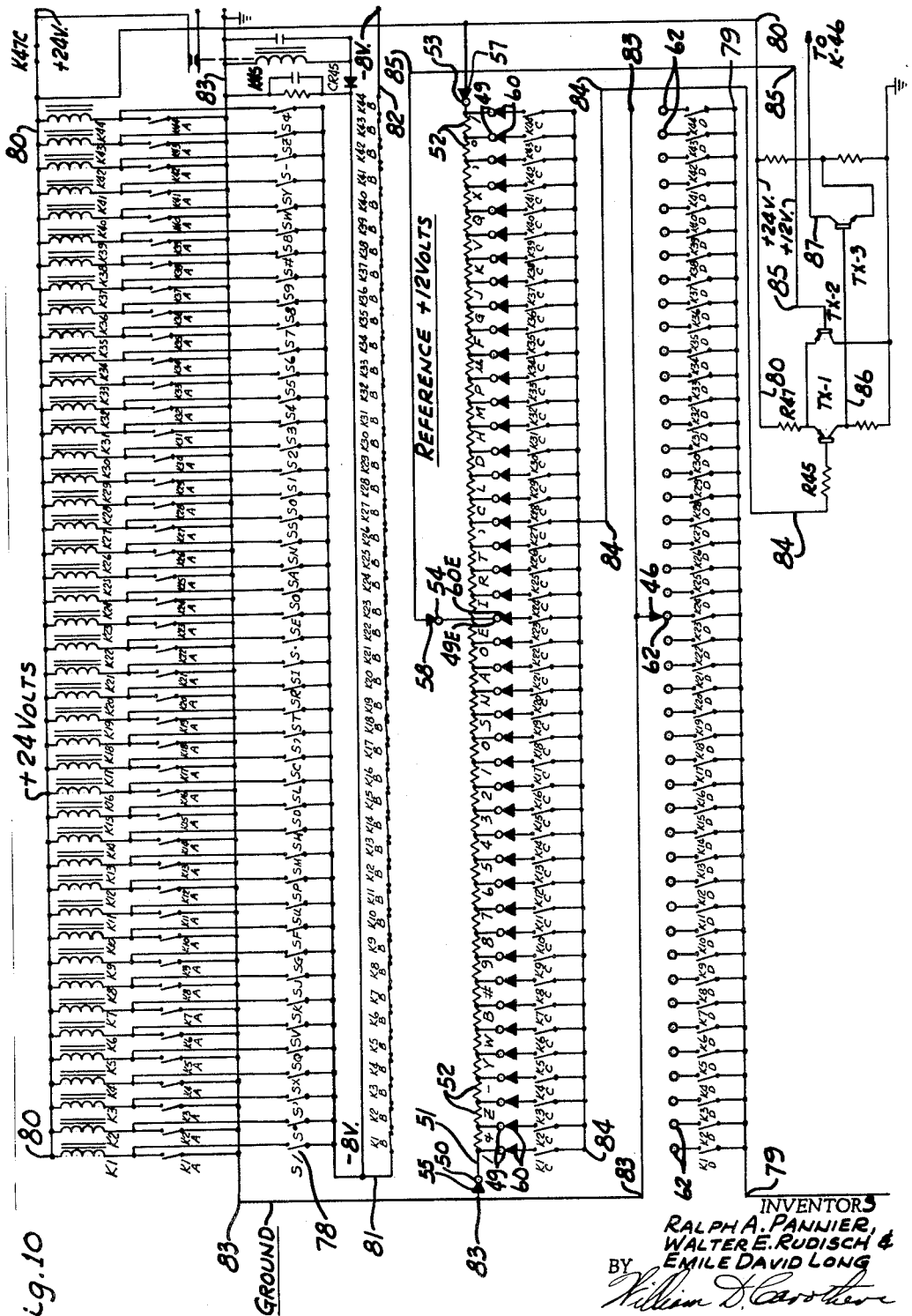

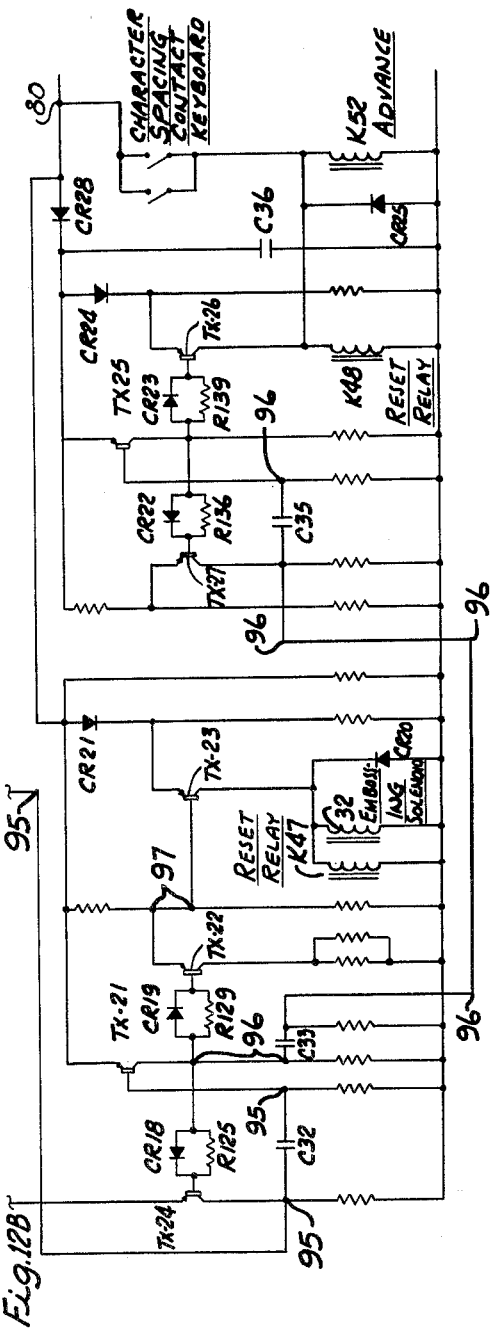
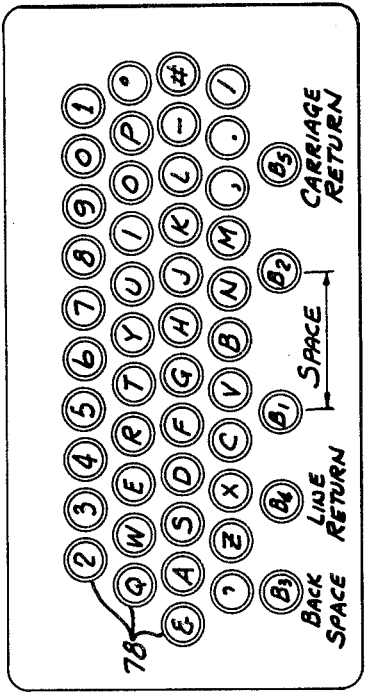
Fig.11

United States Patent Office 3,227,258
Patented Jan. 4, 1966

3,227,258
ROTARY IMPRINTING MACHINE MOVING SELECTED CHARACTER TO IMPRINTING POSITION BY SHORTEST ARC
Ralph A. Pannier, McCandless Township, Allegheny County, Pa., Walter E. Rudisch, Elmira, and Emile David Long, Horseheads, N.Y., assignors to The Pannier Corporation, Pittsburgh, Pa., a corporation of Pennsylvania
Filed July 31, 1962, Ser. No. 213,693
28 Claims. (Cl. 197—6.6)

This invention relates generally to control circuits for different machines which must discriminate between one or more factors and more particularly to a logic control circuit to initially discriminate a direction factor then a predetermined movement to a preselected position to complete the control.

The problem is to move a selected work function to a work station in the shortest possible time. To accomplish this in accordance with this invention the work must move through the shortest distance. To decrease the time the control is translated to a freely rotary disc having control commutator segments disposed in an annular series and connected to a voltage divider or resistance bridge. Thus the disc may be driven in either direction to complete the function in less than half a revolution and by pre-positioning the work function circuits the majority of movement may be less than a quarter of a turn of the disc for eighty five percent of its use. This materially reduces the time element.

This invention further contemplates to speed up this operation by initially over energizing the selected clutch in driving the disc in its selected direction and in operating the brake after the disc has arrived. The over energization of the clutch insures high starting speed of the disc from a constantly operating drive. The selected disc position may be reached before the normal voltage is applied to the clutch. The over energization of the brake stops the disc so quickly that the position is accurately aligned and the operating cycle may be completed.

Another important object of this invention is the provision of a logic circuit that when energized first selectively determines an initial requirement and thereafter completes the operation before carrying through another operation. This logic circuit provides a resistance bridge or voltage divider with a positive voltage at one end and a negative voltage at its opposite end with a fixed intermediate reference connection to this resistance bridge which also has at least one tap connection between the reference and each of the bridge ends. The number of taps required is determined by the number of functions required in the system. If there are two or three positions between which a selection of one is required the problem is relatively simple, but if there are a dozen or a hundred positions the problem becomes more involved and requires more time, but is not any more complicated after the pattern is determined.

A control line may be selectively connected by any one of a series of circuit closing means for each bridge resistance connection each representing a position to complete the logic circuit and perform a function and at the same time interlock this completed circuit to prevent the closing of any similar circuit until the function of the selected circuit has been completed. Since there is but one reference on the resistance bridge and the opposite ends thereof are of opposite polarity with reference thereto and any circuit on either side of this reference is readily determined by the character of the voltage relative to the point of reference.

This resistance bridge is placed on a rotary disc. Each of the tap connections to the bridge are placed in a circular series and represent a function, the control for which is placed on a corresponding circular series around the disc or on a similarly controlled disc or wheel. The first operation of the logic circuit is to determine in which direction the disc should rotate to reach the selected circuit and complete the function. By this logic circuit the shortest distance between the present position and the newly selected character position is chosen to reduce the time involved in moving the disc. If the disc becomes too large because of the number of functions available to be selected, then one disc may select one of two second-class disc which in turn provide the final logic circuit, or in turn each second-class disc selects between two third-class discs and so on in multiples, the total of which is one less disc than twice the last multiple. For example, the sixth class would contain thirty-two and the total would be twice the last number of discs or sixty-four less one each disc could itself easily handle fifty functions.

The disc must have same means of rotating it to present the function at a work or performance station and since this logic circuit can determine the shortest direction of movement to the station selected it then drives the disc in that direction. This operation is easily obtained through a magnetic clutching mechanism by choosing between one of two clutches, both constantly rotating in opposite directions and the clutch selection made drives the disc through the shortest direction to position the selected function at the performance station.

Another object is to provide a quick start and a quick initial movement by over-energizing the clutch to start and thereafter supplying normal voltage.

The disc, and the parts rotated therewith are to be quickly stopped and started in motion in the right direction, should be preferably light in weight to have little inertia in starting and stopping. A series of stationary brake circuit making means such as commutator segments are circularly arranged about the rotary disc which carries a means to close the brake circuits such as a brush. This circuit closing means could be a photoelectric device but a brush and commutator segments are visually expressive of this means. By the selection of the function the logic circuit first directs the direction of movement of the disc and the clutch then drives the disc and when it arrives with the function at the work station this brake circuit is closed. The disc is stopped quickly so that it properly aligns the function at the work station. The quick acting brake is reliable because it is also initially actuated by an over voltage then held by a normal voltage. The over voltage may be twice the normal voltage. A light weight disc may accurately align the function in this manner.

If the positioning of the function may be accomplished in less than a second but not greater than three-fourths of a second relays may be employed to control the operation of this circuit. A polarized relay may be used to control the direction of rotation and an ordinary relay with a front contact means may be used to close the selected clutch and brake circuits and to reset the system for the next selection of a function.

If time is of the essence then the clutch and brake systems can be selected and operated by transistors to complete a function within a few microseconds and at least less than one quarter of a second. The same logic circuit with the bridge feeds two transistors having their emitters tied together and to the twenty-four volt supply through a resistance with the opposite ends of the resistance bridge being connected to ground and the other end is connected to twenty-four volts. Thus a circuit means connecting any tap between ground and reference places a negative voltage on the first transistor causing it to fire and result in the turning the disc one direction. If the selected circuit means connects a tap above the reference the first transistor will be prevented from firing as the voltage would be positive relative to the reference and the reference itself being connected to the second transistor will result in rotating the disc in the opposite direction.

As the disc rotates the selected function sets up a brake circuit that stops the disc when the selected function on the disc reaches the work station. The selected function can be performed and the logic circuit are reset from this disc position for the next impulse representing the next function selected.

As the disc rotates so does the resistance bridge and the characters or functions with it and relative to a fixed work station and every tap is contacted at every position by a fixed brush. The stationary tap brushes and the characters on the rotary disc have only one true matching position and in the chosen instance the letter E is placed at reference of mid point of twelve volts. The character at the position of ground is the diagonal line and the character at the twenty-four volt point is that of the degree mark. The relative position of the bridge resistance its fixed voltages and the taps corresponding to the actual characters on the disc are fixed but the disc moves relative to their corresponding brushes and each character circuit switch means that initiates this logic circuit, connects the selected tap to a common control line.

Thus the positioning of the disc for each character prepositions the resistance bridge circuit relative to the stationary position or work station so that the next character selected will through this logic circuit causes the disc to travel the shortest distance to present the newly selected character at the work station. This logic circuit in combination with additional circuits actually energizes the clutch means or brake means together with the reset relay which interrupts the interlocking circuit and sets the whole of the system in readiness for the next character selection, but does so within a predetermined amount of time which is important to the success in the operation of this invention.

Other objects and advantages appear hereinafter in the following description and claims:

The accompanying drawings show for the purpose of exemplification, without limiting the invention or claims thereto, certain practical embodiments illustrating the principles of the invention wherein:

FIG. 8 is a block diagram of the circuit comprising this invention.

FIG. 9 is a circuit diagram of the voltage supply.

FIG. 10 is a circuit diagram of the keyboard and relay control.

FIG. 11 is a plan view of the character keyboard.

Figure 1:
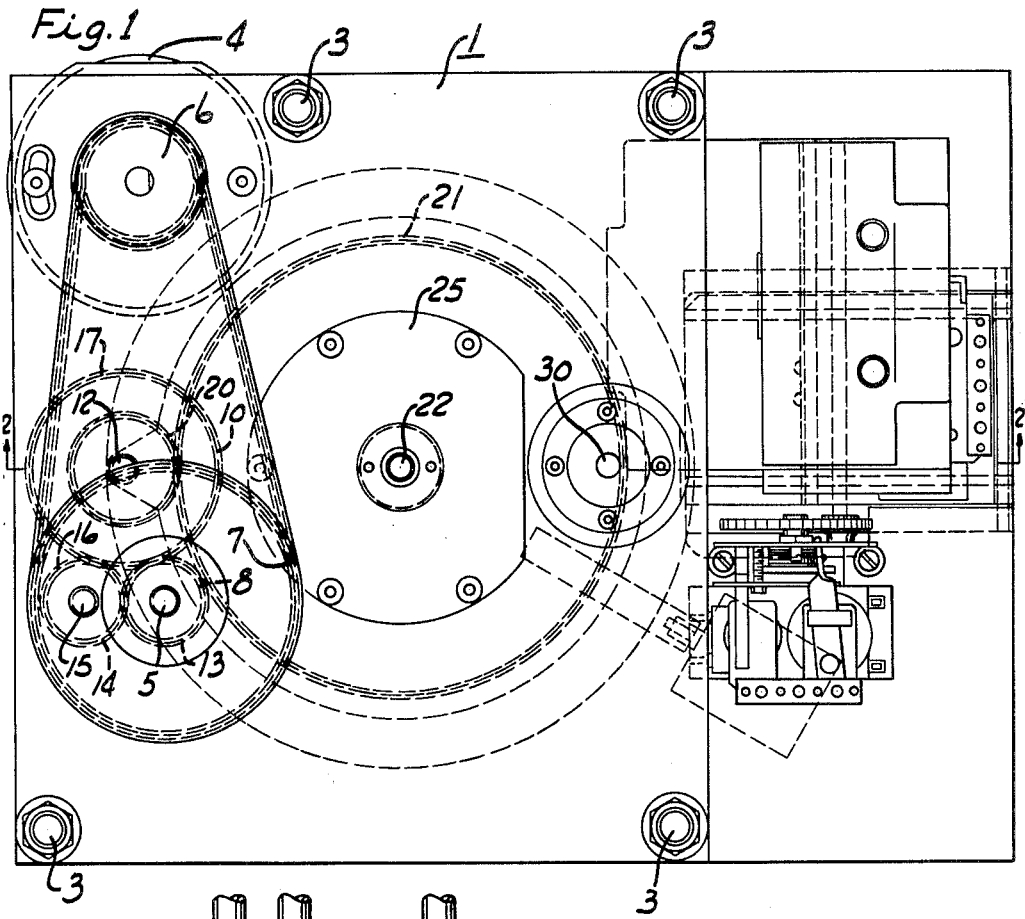
FIG. 1 is a plan view of an embossing machine employing this invention.
Figure 3:
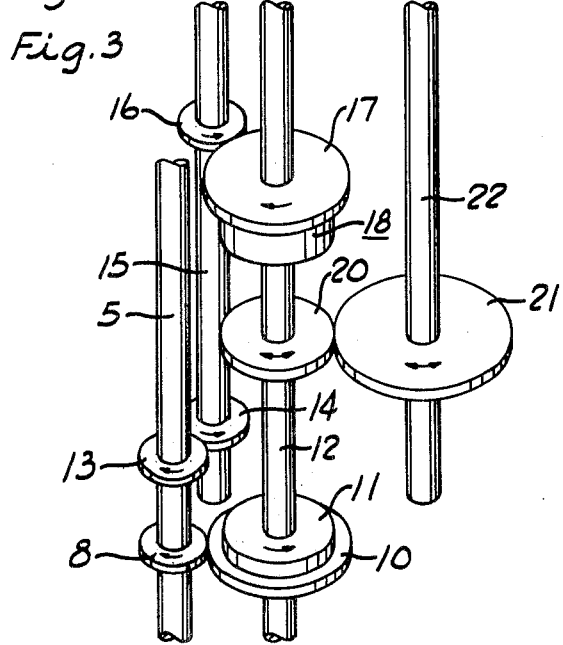
FIG. 3 is a perspective view of the drive shaft arrangement for the machine shown in FIGS. 1 and 2.
Figure 2:
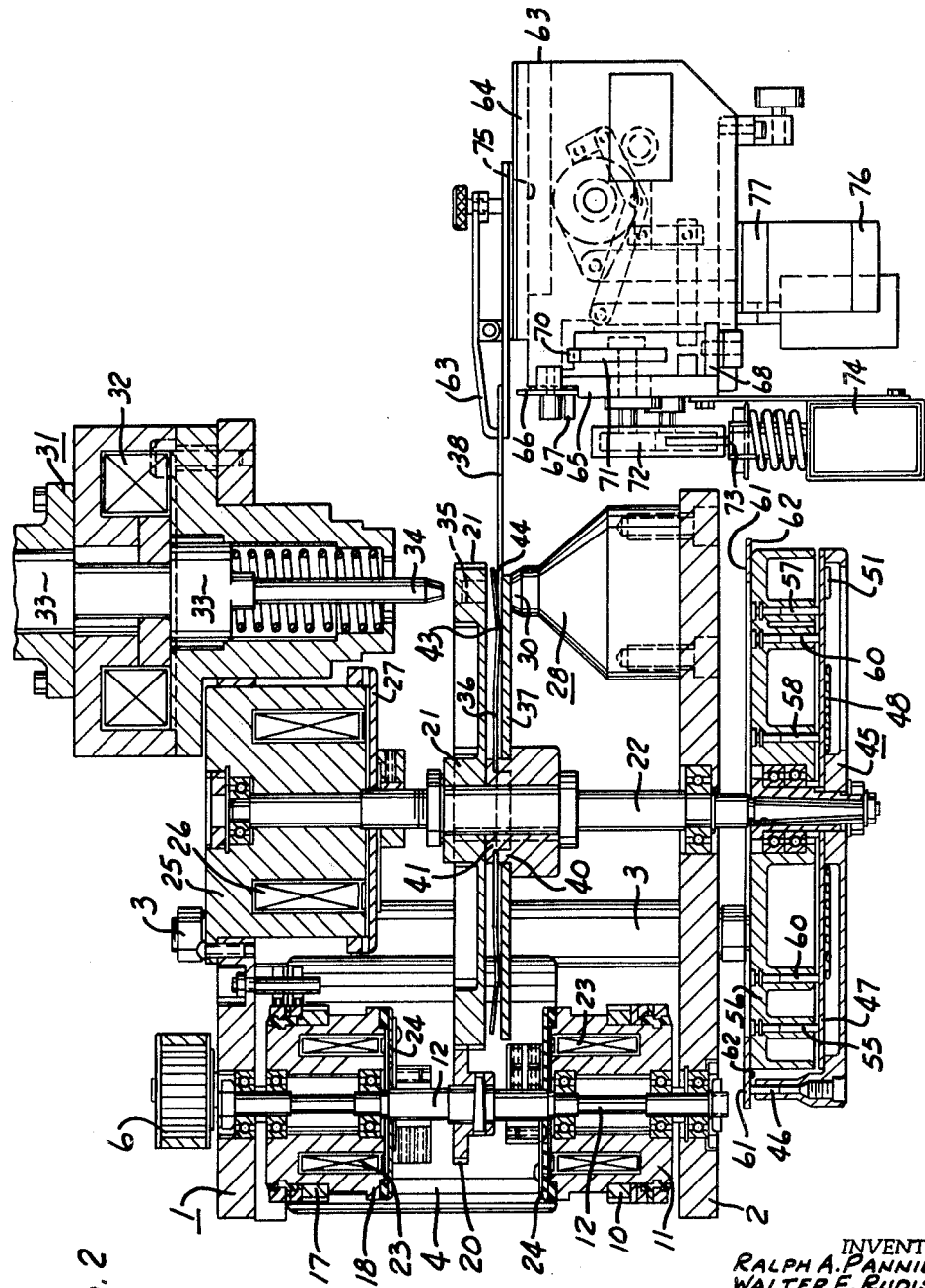
FIG. 2 is a view in vertical section taken on the line 2, 2 of FIG. 1.

As shown in FIGS. 1 to 3 the device used to disclose this logic circuit is an embossing machine which comprises the frame made up of the upper plate 1 and the lower plate 2 that are secured to each other by the post members 3. The motor 4 is secured to the upper plate 1 is a fractional horsepower alternating current motor which drives the clutch counter shaft 5 through the V-belt pulleys 6 and 7 on the motor shaft and the counter shaft respectively. The counter shaft 5 is provided with the gear 8 that meshes directly with the gear 10 forming a part of the forward clutch 11 which is rotatably mounted on the output shaft 12.

The clutch counter shaft 5 is also provided with a gear 13 that meshes with the gear 14 for rotating the jack shaft 15 which in turn is provided with a gear 16 meshing with the gear 17 on the reverse clutch mechanism 18 and is likewise rotatably mounted on the output shaft 12. Thus by selectively energizing the clutch 11 or the clutch 18 the direction of the rotation of the output shaft 12 is determined and this shaft which carries the gear 20 will drive the disc 21 in either direction, which disc is mounted on the rotary shaft 22 carried by space bearings supported from the upper and lower plates 1 and 2.

Each of the clutch member 11 and 18 are provided with the excitation windings 23 which when energized will draw their respective armature 24 to cause the same to rotate therewith. Each armature 24 is secured to the output shaft 12 thus the selected clutch determines the relative rotation of the shaft 12 and the gear 20 which imparts a selected rotation to the disc 21 on the shaft 22.

The shaft 22 is provided with the brake mechanism 25 having an operating coil 26 which is stationary relative to the upper plate 1. The armature 27 of this brake is secured to the shaft 22 and when the brake is energized any rotation of the shaft 22 is abruptly stopped.

Figure 4:
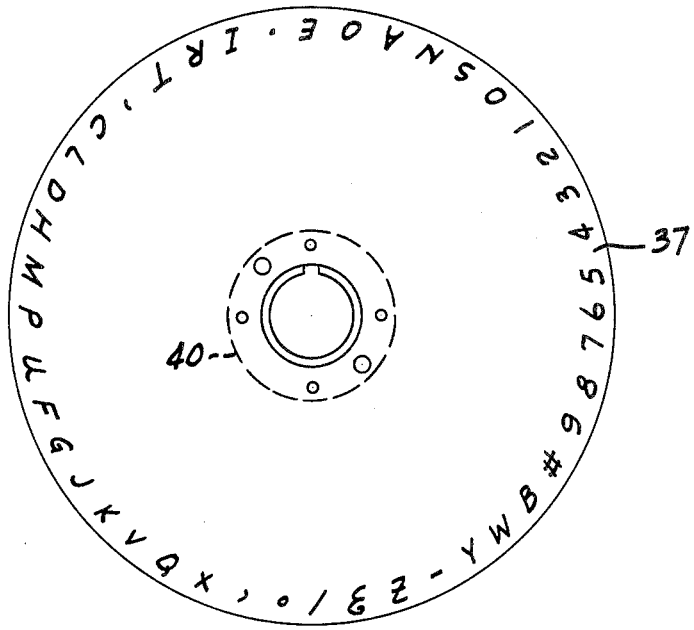
FIG. 4 is a plan view of the male embossing wheel.
Figure 5:
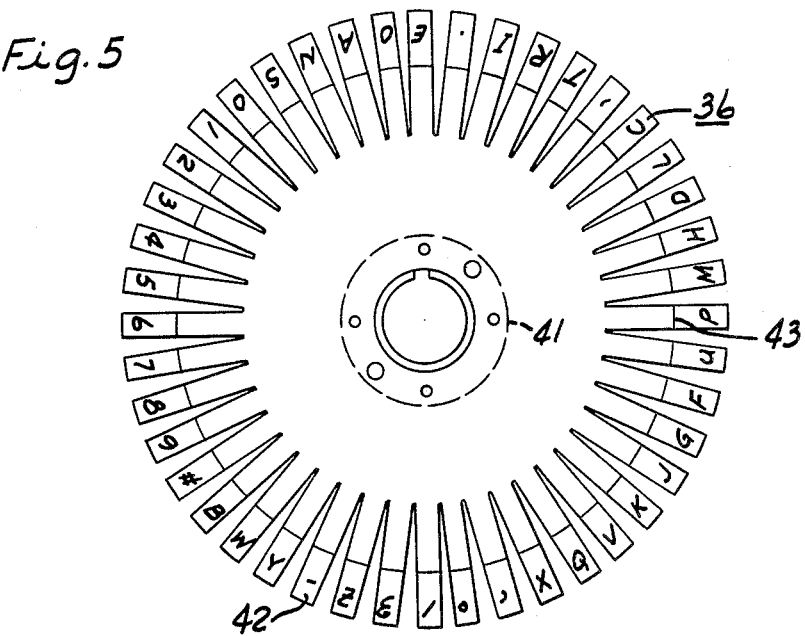
FIG. 5 is a plan view of the female embossing wheel.

As shown in FIG. 2 the lower plate 2 supports the anvil base 28 which anvil is positioned at the work station 30. Above this station is located the solenoid 31 having the operating coil 32 and the spring retracted armature 33. The armature is provided with an operating head 34 which when energized descends through the circular opening 35 of the disc 21 and descends far enough to strike the character on the female disc 36 to force it into engagement with the male disc 37 with a metal work piece to be embossed as indicated at 38 extending between these die discs 36 and 37. As shown in FIGS. 4 and 5 the male disc 37 is a solid disc and has each of the embossed die characters adjacent its rim, the underside of which rests on the anvil 28 at the work station 30. Each of these characters are formed on the top surface of the plate and the plate is sufficiently heavy to prevent any deformation of this plate when struck by the female through the operating head 34. As illustrated the male disc 37 is secured to a hub 40 that is keyed or otherwise secured to the shaft 22 and is provided with an upwardly extending shoulder which gauges the position of the hub 41 of the female disc 36. Thus both discs 36 and 37 are secured relative to the shaft 22. As illustrated in FIG. 5 the female disc 36 is made up of a series of fingers 42, each finger carrying its respective female symbol of the character to be embossed in the work piece 38. Each finger is provided with a bend as illustrated at 43 in FIG. 2 which cants the end of the finger 42 upwardly so as to provide an opening or throat 44 into which the work piece 38 is inserted.

The operating head or hammer 34 is tapered to enter hole 35 in the gear member 21 and will center this gear member if it is not stopped at the proper position by the operation of the brake 25. The brake operates so fast that good alignment is obtained without the hole 35. Thus when the disc 21 carrying the character reference on the wheels 36 and 37 is properly positioned and the solenoid 31 is energized the work piece 38 becomes marked by the character positioned at the work station.

Figure 7:
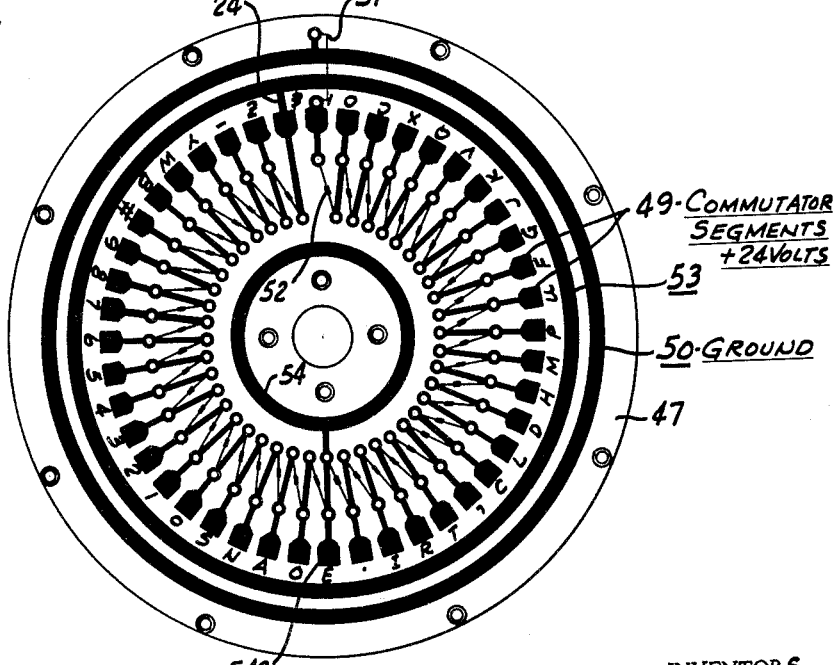
FIG. 7 is a plan view of the rotary disc carrying the resistance bridge comprising this invention.

As shown in FIG. 2 the shaft 22 extends below the plate 2 and carries the rotary wheel 45 that supports the insulated bridge plate or disc 47 as shown in FIGS. 2 and 7. The wheel 45 also supports the brake brush member or circuit actuating means 46. The insulated plate or disc 47 has mounted on the underside thereof a series of resistors 48 and has on the top side thereof a printed key circuit as illustrated in FIG. 7. Thus each resistor connects adjacent portions of the printed circuit.

Referring specifically to FIG. 7 the printed key circuit is provided with a series of forty-four commutator segments 49 each indicated by the character corresponding to the characters shown on character wheel 37 of FIG. 4, which represent the initial or original position of the character disc 37 and bridge disc 47. As shown in the printed circuit the outer collector ring 50 is the ground connection to the bridge circuit and is connected by the jumper 51 to the end commutator segment of the bridge represented by the character & 49. This character represents the ground end of the rotary bridge and each of the commutators clockwise from this position as shown in the printed circuit of FIG. 7 is the same as the characters illustrated on the male wheel 37 of FIG. 4. As shown in FIG. 7 each consecutive commutator segment 49 is connected by a resistance 52. Thus each resistance continues the bridge circuit from the ground commutator to the twenty-four volt commutator indicated by the character of the & mark which is substantially 360° and which commutator is directly connected to the second collector ring 53. Thus the high voltage and ground collector rings 53 and 50 respectively are adjacent each other and surround commutators. The centermost commutator indicated by the character E 49 is directly connected to the inner commutator ring 54 which represents the mid tap of the series of resistances forming the bridge and which is hereafter indicated as the reference. Since there are twenty-four volts connected across the ground 50 to the high voltage ring 53 and each resistance is equal, this mid tap or reference indicated by the collector ring 54 would, of course, be twelve volts.

Figure 6:
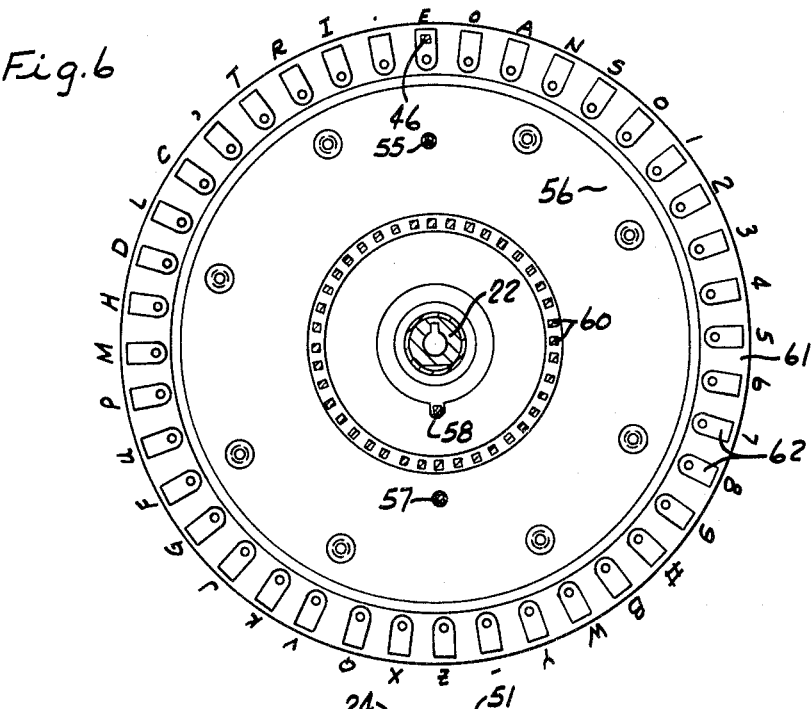
FIG. 6 is a plan view of the underside of the brush holder assembly.

Referring now to FIGS. 2, 6, and 7 the outer collector ring 50 or ground connection is engaged by the brush 55 supported by the stationary brush holder or holder means 56 and which provides a bearing support for the shaft 22. The next collector ring 53 is engaged by the brush member 57 which represents the twenty-four volt supply and the innermost collector ring 54 is engaged by the brush member 58 which represents the reference or center tap of the bridge circuit.

As shown in FIG. 6 a brush member or circuit making means 60 is provided for each of the characters and are forty-four in all and are so marked in FIG. 6 and since the brush holder as shown in FIG. 2 is in vertical section there are two of these brushes or circuit making means 60 indicated.

An annular stationary ring 61 is secured to the top of the brush holder or holder means 56 and is arranged to carry a series of commutators or circuit completing means 62 each of which corresponds to the same characters of the brush member 60 but is employed as a brake commutator contact when engaged by the brush member 46.

Since FIG. 6 illustrates the undesirable of the brush holder and the work station 30 would be at the six o'clock position in FIG. 6, then each of the series of brush members 60 will correspond precisely to embossed characters on the disc 37 as shown in FIG. 4. However, when the brush holder 56 is inverted in position as shown in FIG. 2 the brushes 60 are distributed in the opposite direction relative to the embossed characters as shown in FIG. 4 as well as the commutators 49 as shown in FIG. 7. The reason for this is to permit the commutators segments 49 to be rotated in a direction opposite to the disposition of the brushes 60 to pre-position the embossed character at the work station 30 at the six o'clock position in FIG. 6 while its corresponding brush would be opposite that of the mid position E. This locates the bridge circuit in position to receive the next impulse and allow the logic circuit to rotate the disc in the proper direction regardless of the direction of rotation and regardless of the position of the next character so that it travels the shortest distance to the work station. Thus the movable commutator segments 49 cooperating with the corresponding stationary brushes 60 predetermine the position of the reference on the disc which is designated as the commutator 49 that corresponds to the character E and is connected directly to the center tap or 12 volt ring 54. The brake brush 46 by the same token may be connected to ground through the outer ring 50 or the shaft 22 and closes the circuit through the selected brake commutator 62 which in turn is connected to a corresponding contact of the circuit closing means which when closed will function to actuate the braking to arrest all movement of the disc 47. Each brake commutator 62 is likewise indicated by the reference character which it controls and is radially aligned with the brush commutator 60 that is provided for the same character as shown in FIG. 6.

As shown in FIG. 2 the work piece 38 is held by the clamp 63 on the carriage 64. This carriage is supported on the track member 65 by the horizontally journalled rollers 66 and the vertically journalled rollers 67 and 68. The underside of the carriage is provided with a rack 70 that engages the rack gear 71 mounted on the rotary shaft carrying the ratchet gear 72 actually by the pawl 73 operated by the carriage advance solenoid 74. The carriage 64 is also provided with the ways 75 that slidably support the clamp 63 and movement toward and away from the work station 30 and actuated by the solenoids 76 and 77 for advancing the line or retracting the line by moving the clamp in steps.

These functions are controlled from the keyboard as illustrated in FIG. 11 wherein each of the characters appear on the top of each push button switch 78 in the form of a typewriter. However, the push button circuit closed by these keys is arranged in accordance with the circuit shown in FIG. 10. It will be noted that aside from each of the characters of which there are forty-four in number the keyboard is provided with a back space B3, line return B4, and a carriage return B5, together with two horizontal space buttons B1 and B2 conveniently spaced in relation with each other in the center and below the keyboard. These last two push buttons, of course, could be replaced with a bar so as to provide a closer simulation to that of a keyboard of a typewriter, linotype machine, electric printer or other similar keyboard device.

In view of the foregoing the block diagram of FIG. 8 will have more meaning. The keyboard push buttons close the circuits for the relays K1 to K44 of the relay control circuit together with the carriage control for carriage advance.

The relay control circuit functions through the present position of the logic disc to present the new logic circuit to the resistance bridge from this either the forward or reverse or selector relay K46 or K146 is actuated.

The trigger and delay circuits are also energized.

The brake circuit is set up the K relays.

The brake brush is ready for the brake circuit.

The brake trigger circuit and the trigger and delay circuit function to operate the clutch and brake flip flop circuits which in turn energize the selected clutch with over voltage and then normal voltage circuits and finally close the clutch switch through the selector to over-energize the circuit through the selected clutch for clockwise or counter clockwise rotation of the disc in the shortest direction to the new characters.

The flip flop brake circuit is set up to supply over voltage then normal voltage to the brake switch which in turn then so energizes the brake to stop the disc at the pre-selected position.

The time delay set up by the brake trigger circuit and this delay circuit initiates the embossing circuit which when the embossing switch is closed energizes the embossing solenoid and the embossing circuit also sets up the character advance and resets the circuit for the next selection in the relay control circuit.

The power circuit for this mechanism may be supplied from a 115 volt 50/60 cycle alternating current as shown in FIG. 9 with a switch SW1 interrupting the positive or line side to the primary of the transformer T1 through the double fuses F1 and F2. The secondary of this transformer has two mid taps. This secondary supplies voltage to the two bridge rectifiers RE1 and RE2 where full voltage of the secondary is impressed across the alternating current connections of the bridge RE1. The intermediate winding has its terminals connected to the alternating current connections of the full wave bridge RE2 and the positive of this bridge is connected to the negative of bridge RE1 while the negative of RE2 represents minus eight volts, the center bus is zero of ground and the positive of bridge RE1 is plus twenty-four volts. These represent the three voltage sources of the drawings wherein plus twenty-four volts is 80, ground is 83 and the negative twelve volts is 82. These direct current lines have condensers C1, C2, and C3, therebetween and the positive line is provided with a resistance R50 that functions as a filter for this direct current supply.

Referring to the circuit diagram shown in FIG. 10 the push buttons illustrated in the keyboard bank of FIG. 11 are marked correspondingly with the letter S in combination with their character. Thus the first push buttion is S-/. The second is S-°. Starting at the right the letter is S-&, the next is SZ, and so on.

The center push button S-E has been chosen as the center of the bridge circuit. It is in fact illustrated as the twenty-third push button from the left and the push button S-& is the forty-fourth push button. Each push button is provided with a corresponding relay indicated by the reference numerals K-1 to K-44 inclusive. Each relay has a front or stick contact K1A normally open, the normally closed back contact K1B and a normally open front contact K1C. One side of each of the operating coils of each of the K series relays is connected to the positive voltage bus 80 which in this instance is twenty-four volts. When any one of the selected push buttons S is depressed a circuit is closed from negative eight volts line 82, all of the back contacts B of the K series of relays to line 81 through the bus line 81 which is connected to the opposite side of each of the push buttons and through the closed push button S and its corresponding operating coil to the twenty-four volt positive line 80. There is also a circuit through each of the normally closed back contacts K1B to the minus eight volt tap indicated at line 82, rectifier CR45 and the relay K45, to a ground 83. Thus a current source of thirty-two volts is immediately impressed across the selected relay of the K series corresponding to the selected push button. Thus high or overvoltage causes the relay to snap into place but as soon as it is energized the corresponding K1B back contact is open and at the same time its corresponding K1A front and stick contact is closed to maintain the selected relay energized through this stick circuit directly to ground 83.

When any one of the selected push buttons S has been closed to energize its corresponding relay K no other push button can complete a circuit because the line between 81-82 has been opened by the back cotnact of the corresponding relay, thereby interlocking the system to prevent the operation of two push buttons or relays at the same time. If two push buttons were pushed simultaneously one would be found to close before the other and thus interlock one against the other. Thus over-energization of the relay speeds the closing of the same to invoke a positive interlock.

Each of the relays K1 to K44 is also provided with the front contact K1C to K44C and K1D to K44D. The whole of each of these D series contacts is connected to the corresponding brake commutator segments 62 which are differentiated from each other by their respective character. As shown in FIG. 10 the brake brush 46 is shown to be connected with the brake commutator segment 62E. Thus in the circuit the brake brush 46 connects the ground line 83 to the whole of the front contacts K23D the opposite end of which is connected to the line 79. It will be noted that all of the front contacts are connected to the line 79 and as the brush sweeps around the commutator segments 62 it merely makes a ground connection as indicated in the diagram from line 83 through the brush 46 and its respective D contact of the K-1 to K-44 relays to the line 79 and thence to an operating circuit. The disposition of the brake commutator contacts is 180° displaced from the same characters represented by the brushes 60 in FIG. 6, thus putting ground potential on line 79.

Relay K-45 has its operating coil connected between the ground 83 through the rectifier CR45 to line 81 and all of the back contacts K1B of each of the forty-four relays to line 82 and negative eight volts. Thus the K45 relay, which is called the trigger relay, is maintained energized at all times through this cricuit and its normally closed back contacts would be maintained open as soon as the circuit is energized. However, upon the depressing of a push button key and the energization of its corresponding K relay the opening of the back contact of one of the K1 to K44 relays will of course be affected, thus opening its normally closed back contact K45B. The back contact of this trigger relay initially starts the time delay and other circuits is sequence.

The resistance bridge as illustrated in the printed circuit of FIG. 7 wherein each resistance is connected in series by connecting them between consecutive commutator segments 49, each of which would be specifically represented by the commutator segment 49 in combination with the character it represents. Each of these commutator segments 49 in FIG. 10 is positioned opposite a stationary brush 60 which is likewise designated by the brush number 60 together with the corresponding character that has been adapted thereto. Thus the brushes and the characters as illuserated in FIG. 6 are the same as those as illustrated in the straight line series in FIG. 10 and are shown in engagement with their corresponding printed circuit commutator segment 49. In this position the segment 49E is engaged by the brush 60E. In other words, in its stationary and matched position the character E is chosen to be the dormant position of the disc 47 for the same reasons as that described in regard to the character wheel shown on FIG. 4. The uniformly spaced characters adjacent the perimeter of the disc 37 for presentation at the work station 30 are selected to provide the least arcuate movement of the disc for their use. The following sequence is for substantially half the distance in opposite directions around the disc 37 from a reference point. This position reference point is that of the reference connection at 49E the center of logic bridge shown in FIGS. 10 and 13 and the character for this position is E. The actual characters as shown in FIGS. 4 and 5 on discs 36 and 37 as follows, counterclockwise E, O, A, N, S, 0, 1, 2, 3, 4, 5, 6, 7, 8, 9, #, B, W, Y, -, Z, & and clockwise E, (.), I, R, T, ('), C, L, D, H, M, P, U, F, G, J, K, V, Q, X, (,), °, and /. When placed in this order the disc requires the least rotary movement in reproducing these characters to form words or figures. As previously stated the arrangement of the characters in FIG. 6 which shows the underside of the brush holder appears to be the same as that shown in FIG. 7, the top surface of the printed circuit. However, it must be remembered that in FIG. 6 the brush holder is inverted so that the corresponding brush segment characters in both figures appear to be in the same sequence. However, as shown in FIG. 10 it is obvious that the sequence is inverted. Starting from the norm point indicated by the brush 60E and the corresponding commutator segment 49E. The corresponding front contact K1C to K44C connects the output line 84 to the heel of each of these front contacts of the corresponding relays of K1 to K44 series which are energized by depressing the push button S of any selected character.

As shown in FIG. 10 the ground brush 55 engages the ground collector ring 50 which in turn is connected by the jumper 51 to the ground segment 49.

The center bridge which is known as the reference and which has been connected to E as the norm is also shown by the brush 58 which engages the collector ring 54 and provides the reference line 85 from this logic circuit.

The collector ring 53 is connected with the twenty-four volt circuit by the brush 57. The bridge resistance and the printed circuit to the commutator segments 49 are connected to the opposite end of the bridge circuit to ground by the brush 55.

Thus with the collector rings 50, 53 and 54 and their corresponding brushes 55, 57 and 58 a constant potential is maintained through this voltage divider or resistance bridge circuit and the center point which is always the norm position represented by the character E supplies positive twelve volts as the reference voltage in the mid tap line 85 regardless of the rotation of this resistance bridge. When this circular resistance bridge rotates, it, of course, moves one end off one edge of the view of FIG. 10 and on to the other edge as a continuous member but each of these voltage connections is always maintained and represent the negative and the positive and twelve volt and reference connections. However, the tap connections do change because the resistance bridge moves relative to each of the brush members since the commutator segments 49 of the bridge moves relative to a stationary brush member 60 for each character and the brushes 60 are permanently associated with the character representing the corresponding tap connection to this resistance and is claimed in this manner.

The circuit closing means, of course, would be the push buttons S for each character together with the corresponding relay K1 to K44 and their respective contacts and other necessary circuitry to complete the electrical connections. The tap connections represented by each of the brushes 60 between the relay contacts K1C and K22C will thus supply to the tap connection line 84 a negative polarity with respect to the reference 85. The front contact of the relays K24 to K44 will provide a positive voltage on the common tap output line 84 as compared to the voltage on the reference line 85. These polarities determine which direction that the disc is to rotate to position the next succeeding character at the work station 30. Thus positive and negative tap voltage of course will occur only when the bridge is shown as illustrated in FIG. 10 and if the disc has been rotated so that the reference point 49E is opposite the brush 60 corresponding with the front contact K1C, then each of the contacts from K1C to K23C will appear positive relative to the balance of the contacts which would appear negative. In this manner the actual position of the disc together with the bridge circuit thereon determines the direction of rotation of the disc for the next succeeding character.

As illustrated in FIG. 10 the common tap output line 84 is connected through a resistance R45 to the base electrode of the PNP transistor TX1. The reference 85 is connected to the base of the transistor TX2 and the emitter electrodes of both TX1 and TX2 are connected through a resistance R47 to the line 80 which represents a twenty-four volt power supply. The collector electrode TX2 is connected directly to ground and this transistor will continue to fire and by reason of its firing the resistance between its emitter and twenty-four volt circuit 80 will result in twelve volts on the emitter of TX1. Since a positive twelve volts appears on the emitter of TX1 this transistor cannot fire until the common tap bridge output line 84 is supplied with a negative voltage as compared to the reference 85. When a negative voltage does appear on this common tap bridge connection 84 the TX1 base being negative relative to twelve volts on its emitter will cause the same to fire and its collector in turn is connected by the line 86 to the base of the transistor TX3 of the NPN type which will appear to have twenty-four volts connected from its emitter and across the same and its negative collector electrode will complete the energization of the relay K46, the opposite side of which is connected to 80, the positive twenty-four volt source of supply. This circuit is completed through the back contact K47B which is normally closed, which back contact is opened to cut out K46 and restore the whole circuit to normalcy for the next selection in readiness to receive the impulse upon depressing the push button for the next character. As transistor TX1 fires it reduces the voltage on the emitter of TX2, causing it to stop firing and as soon as TX1 ceases to fire the transistor TX2 will again fire to place positive twelve volts on the emitter of TX1.

Figure 12:
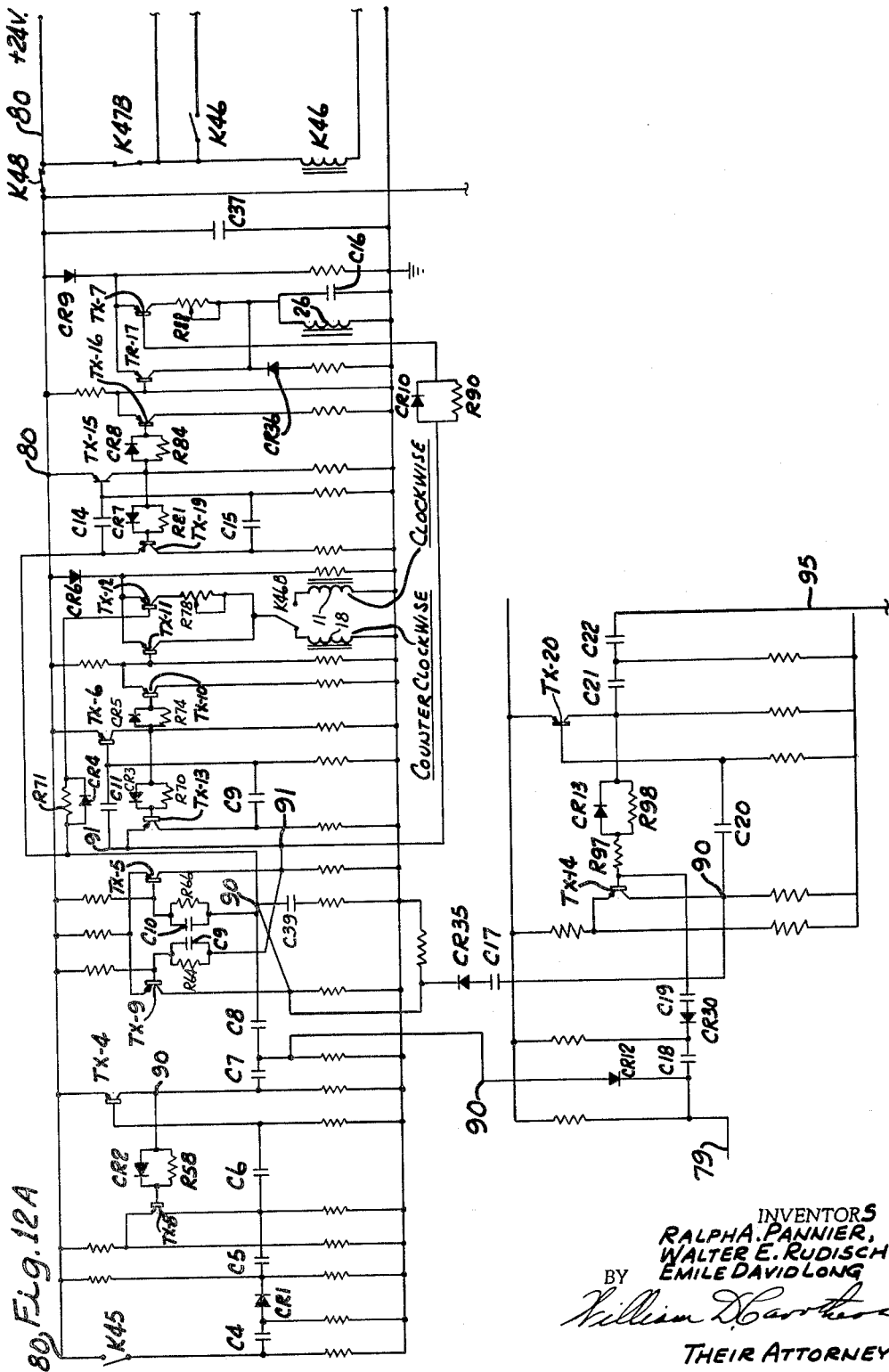
FIG. 12A is a circuit diagram of the rotation logic circuits for actuating the clutch and brake mechanism.
FIG. 12B is a circuit diagram showing a continuation of FIG. 12A for performing the function at the work station and resetting the circuit.

As shown in FIG. 12 when a negative voltage supplied to the common tap output line 84 causes TX1 to fire resulting in the energization of relay K46 its normally closed back contact K46B will be shifted from the position of that shown. This contact is under the transistor TX11. If a positive voltage is supplied by the common tap output line 84 to TX1 then the relay K46 will remain de-energized and its contact K46B will remain as illustrated in FIG. 12. The normally closed back contact K46B of the ordinary relay K46 will connect the counter clockwise drive clutch 13. When the relay K46 is energized its normally closed back contact K46B will connect the clockwise drive through clutch 11. Thus the relay K46 determines the direction of rotation by being either energized or de-energized. This function must be assumed by a polar relay in the alternate circuit. Even though the direction of rotation of the disc is selected, delay has been placed on the circuit and the transistor TX11 and TX12 may not at this time be energized to supply voltage to selected clutch winding.

Upon depressing the push button of FIG. 10 and causing one of the relays of K1 to K44 series to be energized the interlocked circuit through line 81 thus de-energizes the relay K45 and causes its back contact K45B to close connecting voltage from line 80 through a rectifier CR1 and appropriate condensers C4, C5, and C6 to create time delay and thence to the base electrode of the transistor TX4 causing this transistor to fire and its output 90 being connected by the condensers C7 and C8 and the time delay coupling R66, with C10 to the base electrode of transistor TX5, the output of which is connected by line 91 and condenser C11 to the base electrode of transistor TX6 which in turn is instrumental in firing transistor TX6. Transistor TX5 also through line 91 and the coupling using resistance R90 rectifier CR10 in multiple is connected to the base of transistor TX7 which places an impulse less than a few microseconds that does not energize the brake winding 26 sufficiently to operate the same.

The output 90 of TX4 also applies a voltage through CR12 to 79 the common brake circuit ground line closed by the rotary brush 46.

During the lapse of time from when TX4 was first caused to fire the time delay coupling from line 90 through multiple CR2 with R58 to the base of TX8 at sufficient time delay period to fire TX8, it supplies an impulse through C6 sufficient to shut off TX4.

A sufficient time has elapsed from the initial firing of TX5 to fire TX9 from line 91 through the time delay circuit employing the resistance R64 and condensers C9 in multiple and the firing of TX9 will shut off TX5. About this time the time delay circuit from TX6 of the rectifier CR5 in multiple with the resistance R74 will permit the firing of TX10 which is shorted to ground through a resistance, thereby reducing the twenty-four volts effective on the base of TX11. With the voltage reduced on the base TX11 it is permitted to fire and its duration will last from four to six milliseconds during which time it places twenty-four volts on the line 92 and thence through the contactor K46B to the counter clockwise drive clutch 18. This over voltage of twenty-four volts directly applied to the clutch 18 causes it to initially start very fast and after four to six milliseconds the transistor TX12 then fires maintaining twelve volts to the line 92 to continue the operation of the energized clutch 18 until the disc swings to the proper position and the brake brush 46 engages the selected brake commutator segment 62 to apply the brake and stop the disc to make a ground connection on the line 79 to lower the voltage from the base of TX14 through CR30.

About the time that TX10 became energized to fire, TX6 will fire TX13 through its parallel circuit made up of the rectifier CR3 in multiple with the resistance R70 will also fire and thus turn off TX6 and prepare it for the next pulse which would be received from TX14.

TX4 also initially started the energization of TX15 through the condenser C14, the firing of which will energize TX16 through the multiple resistance R84 and rectifier circuit CR8. When TX16 fires it substantially short circuits the line 94 to the base of TX17 allowing this transistor to fire for the purpose of supplying twenty-four volts to the brake 26 which will continue for approximately six milliseconds and thereafter the transistor TX18 will become energized to continue to supply twelve volts to the brake 26. Transistor TX18 was formerly energized as TX7 for an impulse.

After the over voltage has been applied by the transistor TX17, transistor TX18 continues a normal potential of twelve volts on the brake 26.

Intermediate this time the brake brush 46 will have arrived at the position where the brake is to be applied which will cause the line 79 to be made ground and when this line is made to be ground the transistor TX14 becomes energized through CR30 causing the current to flow into line 90 through condenser C17 and rectifier CR35 to line 90 which shuts off and again re-energizes TX5 and the output thereof initiates the sequence of operation of TX15, TX16, TX17, and TX18 to energize the brake 26 and in the meantime TX9 again de-energizes and shuts off TX5.

When the line 79 becomes substantially ground the line 90 connection between condensers C7 and C8 also becomes ground and thus shuts off TX9.

After the delay caused by the condenser C20 the firing of TX14 initiates the firing of TX20 which in turn turns off TX14 by supplying current to the line 95 and the current passing through R98 and CR13 in multiple. The energization of line 95 and condenser C21 and C22 is effective in firing TX21 which in turn energizes line 96 to fire after proper time delay by multiple circuit R129, CR19 to TX22 which reduces the voltage on line 97 causing TX23 to fire and supplying twenty-four volt current through the reset relay K47 and the embossing solenoid energizing coil 32.

As previously explained the back contact K47B of reset relay K47 opens the circuit through relay K46, thus interrupting the output of TX3. Back contact K47C also shuts off twenty-four volt supply line to the relays K1 to K44 series and shuts off the voltage to the bridge, thereby completely restoring the circuit. By the time that the reset relay K47 and the embossing solenoid 32 have functioned with the single pulsations for a period of approximately six milliseconds the whole of circuit is reset for the next operation and about this time TX24 becomes energized to shut off TX21, however not before TX21 has had sufficient time to energize TX25 through line 96 and condensers C33 and C35. The energization of TX25 supplies current to line 97 which through the time delay of R139 and CR23 will operate TX26 that directly energizes reset relay K48 and character spacing relay K52 which permits the operation of the keyboard and carriage circuits. When reset relay K48 has been energized TX27 will fire through the delay circuit of CR22 in multiple with R136 to shut off TX25. Character spacing relay K52 will advance the carriage 64 one space for the next letter or character.

Figure 13:
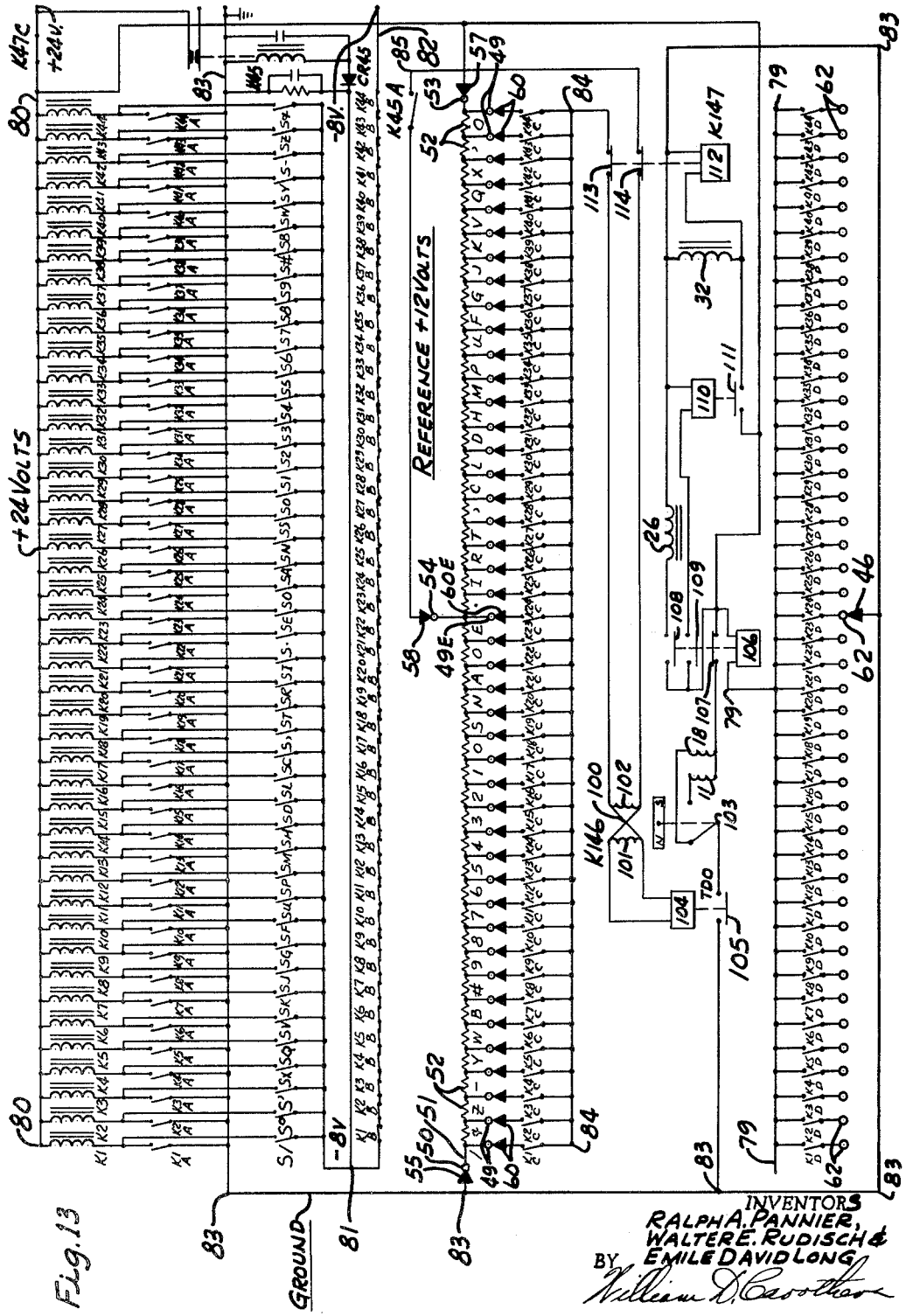
FIG. 13 is a circuit diagram of a modification of this invention.

Referring to FIG. 13 the bridge circuit on the disc is the same as that of FIG. 10 and the twelve volt mid tap line 85 is connected to the opposite ends of the operating coils 101 and 102 of the polar relay 100 or K146 having a permanent magnet armature. The other ends of the operating coils 101–102 are connected to the tap connection output 84. Thus any push button that is actuated when the circuit is in condition for operation will properly energize the polar relay and throw its polarity contact 103 either to the clutch actuating coils 11 or 18 depending upon whether the disc is to be rotated clockwise or counter clockwise. By energizing the actuating coils of the polar relay one also energizes the circuit closing relay 104, its front contact 105 of which when closed will energize the selected clutch 11 or 18 through the polar relay contact 103 and back contact 107 of relay 106.

The line 79 is connected to the ground end of the operating relay 106, the back contact 107 of which interrupts the operation of the clutch circuit and the front contact 108 operates the brake actuating coil 26 to stop the rotary movement of the disc. The second front contact 109 of the relay 106 actuates the time delay relay 110, the front contact of which applies twenty-four volts to the embossing solenoid 32. This functions similar to the time delay provided by the transistors TX21 to TX27. The front contact 111 which energizes the embossing coil 32 also energizes the time delay relay 112 or K147, which after a time period will open its normally closed back contact 113 and interrupt or reset relay 100 or K146 and will also after the same time delay open back contact 114 to reset or interrupt the relay 100 or K146 at its opposite polarity. This relay 106 functions to take the place of transistors TX14 through TX20. By the same token polar relay 100 or K146 and its circuit operating relay 104 takes the place of transistors TX1 through TX13.

It is shown from FIG. 13 that substantially the same functions as that performed by the transistors is performed by means of these relays. However, the difference in time is a matter of approximately two hundred and fifty to five hundred milliseconds. In other words, the transistor circuit may be actuated to function within a quarter of a second or two hundred and fifty milliseconds, whereas the circuit of FIG. 13 may require anywhere from one-half to three-fourths of a second which may be on the order of five hundred to seven hundred and fifty milliseconds. Crystal case type relays may be employed for this work which are operated under vacuum and which are capable of carrying a substantial current to function in circuits of this character and provide relatively quick operation.

I claim:

1. A logic circuit consisting of a resistance having a positive and a negative voltage connection to its opposite ends, a fixed reference connection to said resistance at an intermediate position, at least one tap connection to said resistance between said reference connection and each of its opposite ends, each tap corresponding to an independent function, a control line, selectively actuatable circuit closing means from said control line to each of said connections on said resistance, and means to interlock said circuit closing means to allow only one circuit to be closed at any one time.

2. The circuit of claim 1 characterized by selection means connected between said reference and said control line and selectively actuated by said circuit closing means depending upon its polarity relative to said reference.

3. The circuit of claim 2 characterized by a disc rotatably supporting said resistance, brush means to engage said reference connection and said positive and negative voltage connections and said tap connections on said rotary disc, means to selectively rotate said disc in either direction depending on the operation of said selector means.

4. The circuit of claim 3 characterized by a brake brush mounted in fixed relation to said reference and to move with said disc, a stationary series of connections to be engaged by said brake brush each connection corresponding to each of said circuit closing means, brake means to stop said disc by completing its circuit through said brake brush when said disc is aligned with the position corresponding to the selected circuit closing means.

5. The circuit of claim 2 characterized in that said selector means is a polar relay.

6. The circuit of claim 2 characterized in that said selector means is one transistor having its base connected through a resistance to said control line and fired by a potential from said control line that is negative relative to said reference, and a second transistor having its base connected to said reference and fired by a potential from said reference that is negative relative to said positive polarity connection, the emitters of said transistors connected together and through a resistance to said positive polarity.

7. The circuit of claim 3 characterized in that said means to selectively rotate said disc is a clutch means alternately engageable with a rotary drive in opposite directions to selectively move said disc through the shortest arc to the corresponding position of the selected circuit closing means.

8. The circuit of claim 7 characterized in that said means to selectively rotate said disc also includes a transistor means connected in a circuit to initially supply a high over voltage to actuate the clutch and thereafter apply a lower normal operating voltage to said clutch means.

9. The circuit of claim 8 characterized by a brake brush mounted to move with said disc and in fixed relation to said reference, a stationary series of connections to be engaged by said brake brush, each of said stationary connections corresponding to each of said circuit closing means, brake means to stop said disc by completing its circuit through said brake brush when said disc is aligned with the position corresponding to the selected circuit closing means, said brake means including a transistor means connected in a circuit to initially supply a high over load voltage to actuate the brake and thereafter apply a lower normal operating voltage thereto to quickly stop the disc.

10. Rotary indexing mechanism consisting of a rotary member, a continuous resistance bridge disposed circularly on said rotary member and having fixed voltage connections of opposite polarity at its opposite ends and a fixed intermediate tap connection, an annular series of spaced commutator segments carried by said rotary member, each segment connected with a portion of said continuous resistance to form a series of intermediate resistance taps, rotary clutch means connected to drive said rotary member in opposite directions, a work-functioning mechanism positioned by said rotary member corresponding to each of said commutator segments, a work station to which each of said work-functioning mechanisms may be selectively presented, an annular series of brush members corresponding to each work-functioning mechanism and fixedly mounted to match and engage said commutators on said rotary member regardless of its rotary position to transmit the current from said resistance bridge corresponding to the selected work function, an annular series of stationary contact brake segments to correspond with the series of work-function mechanisms designated by said commutator segments, a brake brush means on said rotary member to engage said stationary contact brake segments, circuit closing means corresponding to each work-function mechanism of the series to be connected to energize said bridge which from the position of said rotary member and select the direction of rotation of said rotary member to position the chosen work-function mechanism at said work station, and brake means energized through said brake brush contacting the selected contact segment to stop the selected work-function at said work station.

11. A rotary embossing structure comprising a character disc having a series of raised characters around its perimeter, means for rotating said character disc on a vertical axis, a second disc mounted to rotate with said character disc and carrying a resistance having a positive and a negative voltage connected to its opposite ends, a fixed reference connection to said resistance at an intermediate position, at least one top connection to said resistance between said reference connection and each of its opposite end connections, each of said connections including each tap connection corresponding to an independent function in the form of one of said raised characters on said character disc, selectively actuatable circuit closing means to each of said connections on said resistance, means to interlock said circuit closing means to allow only one circuit to said connections to be closed at any one time, said selectively actuatable circuit closing means pre-positioning said character disc at a work station and electrically operated means for impressing a work piece on the selected character at the work station.

12. The structure of claim 11 which also includes a third rotary disc made up of a series of independent radially projecting fingers each finger having free movement relative to the adjacent fingers, indented character in each fingers corresponds to and mates with the raised characters on said character disc, said fingers being initially bent away from said character disc to provide an open gap for receiving the work piece at said work station and for receiving said electrically operating means to make an embossed impression on the work at said work station.

13. The character imprinting machine of claim 18 wherein said character disc includes a rotary embossing disc arrangement for mounting on a rotary axis, uniformly spaced characters adjacent the perimeter of said disc for presentation at a work station said characters being selected in the following sequence for half the disc in opposite directions around said disc from a reference point E, E, O, A, N, S, 0, 1, 2, 3, 4, 5, 6, 7, 8, 9, #, B, W, Y, -, Z, &, to /, and E, (.), I, R, T, (,), C, L, D, H, M, P, U, F, G, J, K, V, Q, X, ', °, to said /, progressions requiring the least rotary movement of said disc in reproducing said characters in words and figures.

14. A voltage divider consisting of a disc mounted for rotation, a printed circuit on one face of said disc said printed circuit including a series of at least three annular rings, a series of commutator segments in said printed circuit adjacent commutator segments being permanently connected to two of said rings to form the remote ends of said voltage divider circuit, a resistance means between adjacent commutators starting from one end and continuing through to the other end of said adjacent commutator segments, the midpoint of said commutator segments being permanently connected to the third ring, and brush connections for independently engaging each of said rings and each commutator segment.

15. The structure of claim 14 which also includes a brush holder for cooperating with said printed circuit and mounted for relative rotary movement therewith, said brush means carried by said brush holder, said brushes engaging said segments, two annular rings supplying the opposite ends of said voltage divider with opposite voltage polarities and said third ring supply an intermediate voltage to its corresponding brush means, an independent circuit means connected to each of said annular series of brushes which engage the respective commutator segments of said printed circuit.

16. The structure of claim 15 which also includes an annular series of commutator segments supported on said brush holder, each commutator segment corresponding to said series of brushes carried by said brush holder, brush means carried by said disc to engage the annular series of commutator segments supported by said brush holder and circuit means completed between said brush means and each of said annular series of commutator segments supported by said brush holder.

17. A machine for imprinting characters comprising a frame having a character imprinting station and supporting a freely rotatable rotary driven shaft having secured thereto a first disc with characters to be imprinted at said imprinting station and a second disc with a direction logic means corresponding to the position of the characters on said first disc, brake means to arrest said freely rotatable shaft when a selected character is positioned for imprinting at said imprinting station, a brush holder means supported from said frame and carrying brushes to cooperate with said direction logic means on said second disc, means associated with said brush means on said brush holder means and said direction logic means to select the direction and initiate the rotation of said shaft, a series of commutator segments on said brush holder means corresponding to the position of the characters on said character disc, and a brush on said second disc to engage said commutator segments on said brush holder means corresponding to the character selected when the latter reaches said imprinting station to apply said brake means to permit the character selected to be imprinted.

18. A machine for imprinting characters comprising a frame having a character imprinting station and supporting a freely rotatably rotary driven shaft having secured thereto a first disc with characters to be imprinted at said imprinting station and a second disc with a direction logic means corresponding to the position of the characters on said first disc, brake means to arrest said freely rotatable shaft when a selected character is positioned for imprinting at said imprinting station, a connection holder means supported from said frame and carrying connection means to cooperate with said direction logic means on said second disc, means associated with said connection means on said connection holder means and said direction logic means to select the direction and initiate the rotation of said shaft, a series of commutator segments on said connection holder means corresponding to the position of the characters on said character disc, and a brush on said second disc to engage said commutator segments on said connection holder means corresponding to the character selected when the latter reaches said imprinting station to apply said brake means to permit the character selected to be imprinted.

19. The character imprinting machine of claim 18 which also includes means to selectively first over-energize the means associated with said connection means that initiates the rotation of said shaft to quickly start said shaft.

20. The character imprinting machine of claim 18 which also includes means to selectively first over-energize said brake means to arrest said freely rotatable shaft when a selected character is positioned for imprinting at said imprinting station.

21. The character imprinting machine of claim 18 which also includes means to clear said means associated with said connection means for the following selection of the direction and initiate the rotation of said shaft for the next selected character to be imprinted at said character imprinting station.

22. The character imprinting machine of claim 18 which also includes an interlock means to prevent said means associated with said connection means from setting up the next character to be selected for imprinting until the previous character selected has been imprinted.

23. The character imprinting machine of claim 18 wherein said direction logic means includes a resistance bridge circularly arranged on said second disc with a positive potential connection at one end and a negative potential connection at its other end and a central reference connection, and a plurality of intermediate tap connections on each side of the central reference connection, said connections each representing a character on said first disc.

24. The character imprinting machine of claim 18 wherein said means associated with said connection means to select the direction and initiate the rotation of said shaft also includes means to complete the imprinting of the selected character.

25. The character imprinting machine of claim 24 which also includes means to complete the cycle of operation of imprinting of the selected character within a timed limitation.

26. The character imprinting machine of claim 18 wherein said means associated with said connection means to select the direction and initiate the rotation of said shaft also includes a polarized relay to control the direction of rotation of said shaft and a relay with front contacts to operate said brake means and to imprint the selected character at the character imprinting station.

27. The character imprinting machine of claim 18 wherein said means associated with said connection means to select the direction and initiate the rotation of said shaft and the operation of said brake means includes a solid phase circuit with selected flip flop and time delay circuits operating in conjunction with each other.

28. A machine for imprinting characters comprising a frame having a character imprinting station and supporting a freely rotatably rotary driven shaft having secured thereto a first disc with characters to be imprinted at said imprinting station and a second disc with a direction logic means corresponding to the position of the characters on said first disc, brake means to arrest said freely rotatable shaft when a selected character is positioned for imprinting at said imprinting station, a holder means supported from said frame and carrying circuit making means to cooperate with said direction logic means on said second disc to determine the direction of rotation for the shortest travel of the disc to the next selected character, means associated with said circuit making means on said holder means and said direction logic means to complete the selection of the direction and initiate the rotation of said shaft, a circuit completing means mounted on said holder means for each character and positioned relative to said characters on said first disc, and circuit actuating means on said second disc to cooperate with said circuit completing means on said holder means to stop the character on said first disc when it reaches said imprinting station to apply said brake means and imprint the same.

References Cited by the Examiner
UNITED STATES PATENTS

| | | | |
|---|---|---|---|
| 580,014 | 4/1897 | Souder | 197—48 |
| 848,824 | 4/1907 | Hawkins | 197—6.7 |
| 1,399,084 | 12/1921 | Schermerhorn | 307—41 |
| 1,850,769 | 3/1932 | Porsche | 338—185 X |
| 1,961,156 | 6/1934 | McCain | 197—6.6 |
| 2,192,594 | 3/1940 | Brand | 197—11 |
| 2,812,407 | 11/1957 | Budd | 338—171 |
| 2,813,987 | 11/1957 | Taylor | 323—74 |
| 2,847,589 | 8/1958 | Haydon | 310—268 X |
| 2,864,307 | 12/1958 | Hilton et al. | 101—93 |
| 2,867,705 | 1/1959 | Beckwith | 338—171 |
| 2,927,676 | 3/1960 | Abbodanza | 197—6.6 |
| 2,991,710 | 7/1961 | Harwood | 101—93 |
| 2,999,202 | 9/1961 | Ule | 323—74 |
| 3,029,920 | 4/1962 | Seifried | 197—6.6 |
| 3,059,750 | 10/1962 | Schnellmann | 197—6.6 |
| 3,083,807 | 4/1963 | Travaglio | 197—6.7 |
| 3,090,001 | 5/1963 | Van Horne | 323—79 |

ROBERT E. PULFREY, *Primary Examiner.*

WILLIAM B. PENN, *Examiner.*